United States Patent [19]
Hattori et al.

[11] Patent Number: 6,006,824
[45] Date of Patent: Dec. 28, 1999

[54] CERAMIC SHELL-AND-TUBE TYPE HEAT EXCHANGER, AND METHOD FOR MANUFACTURING IT

[75] Inventors: Mitsuru Hattori, Ama-gun; Keiichiro Watanabe, Kasugai; Toshihiro Yoshida, Nagoya, all of Japan

[73] Assignee: NGK Insulators, Ltd., Nayoga, Japan

[21] Appl. No.: 09/260,550

[22] Filed: Mar. 2, 1999

Related U.S. Application Data

[63] Continuation of application No. 08/771,880, Dec. 23, 1996, abandoned.

[30] Foreign Application Priority Data

Mar. 28, 1994 [JP] Japan ....................................... 6-57186

[51] Int. Cl.$^6$ ....................................................... F28F 9/00
[52] U.S. Cl. ......................... 165/162; 165/158; 165/160; 165/161
[58] Field of Search .................................... 165/176, 174, 165/160, 167, 162, 153, 158, 152, 161; 62/515

[56] References Cited

U.S. PATENT DOCUMENTS

| | | | |
|---|---|---|---|
| 4,222,434 | 9/1980 | Clyde | 165/162 X |
| 5,069,169 | 12/1991 | Maruko | 165/161 X |
| 5,238,057 | 8/1993 | Schelter et al. | 165/158 |

*Primary Examiner*—Christopher Atkinson
*Attorney, Agent, or Firm*—Kubovcik & Kubovcik

[57] ABSTRACT

A method for manufacturing a ceramic shell-and-tube type heat exchanger having a plurality of heat transfer tubes and tubular plates joined to both the end portions of these heat transfer tubes which has the steps of inserting the heat transfer tubes of sintered tubular ceramics into through-holes of the tubular plates of unsintered plate-like ceramics having a plurality of the through-holes, standing the heat transfer tubes vertically to a floor surface, and then firing them in a condition where the tubular plates are positioned at both the upper and lower end portions of the heat transfer tubes, thereby integrally joining the tubular plates to both the end portions of the plurality of heat transfer tubes by the utilization of a difference between firing shrinkage ratios of both the members, the method having the steps of interposing at least one tubular plate between the tubular plate positioned at the upper end portions and the tubular plate positioned at the lower end portions of the heat transfer tubes, and then firing them to integrally join them. The ceramic shell-and-tube type heat exchanger can be obtained in which the deformation of the heat transfer tubes can be remarkably inhibited and which is free from the deterioration of joining strength due to the deformation of the heat transfer tubes in the firing join step and the occurrence of gas leakage due to a joining failure.

4 Claims, 7 Drawing Sheets

PRIOR ART

Fig. 5

PRIOR ART

CERAMIC SHELL-AND-TUBE TYPE HEAT EXCHANGER, AND METHOD FOR MANUFACTURING IT

This application is a continuation of application Ser. No. 08/771,880, filed Dec. 23, 1996 now abandoned.

BACKGROUND OF THE INVENTION (i) Field of the Invention

The present invention relates to a ceramic shell-and-tube type heat exchanger, and a method for manufacturing the same.

(ii) Description of the Related Art

Figure 6:
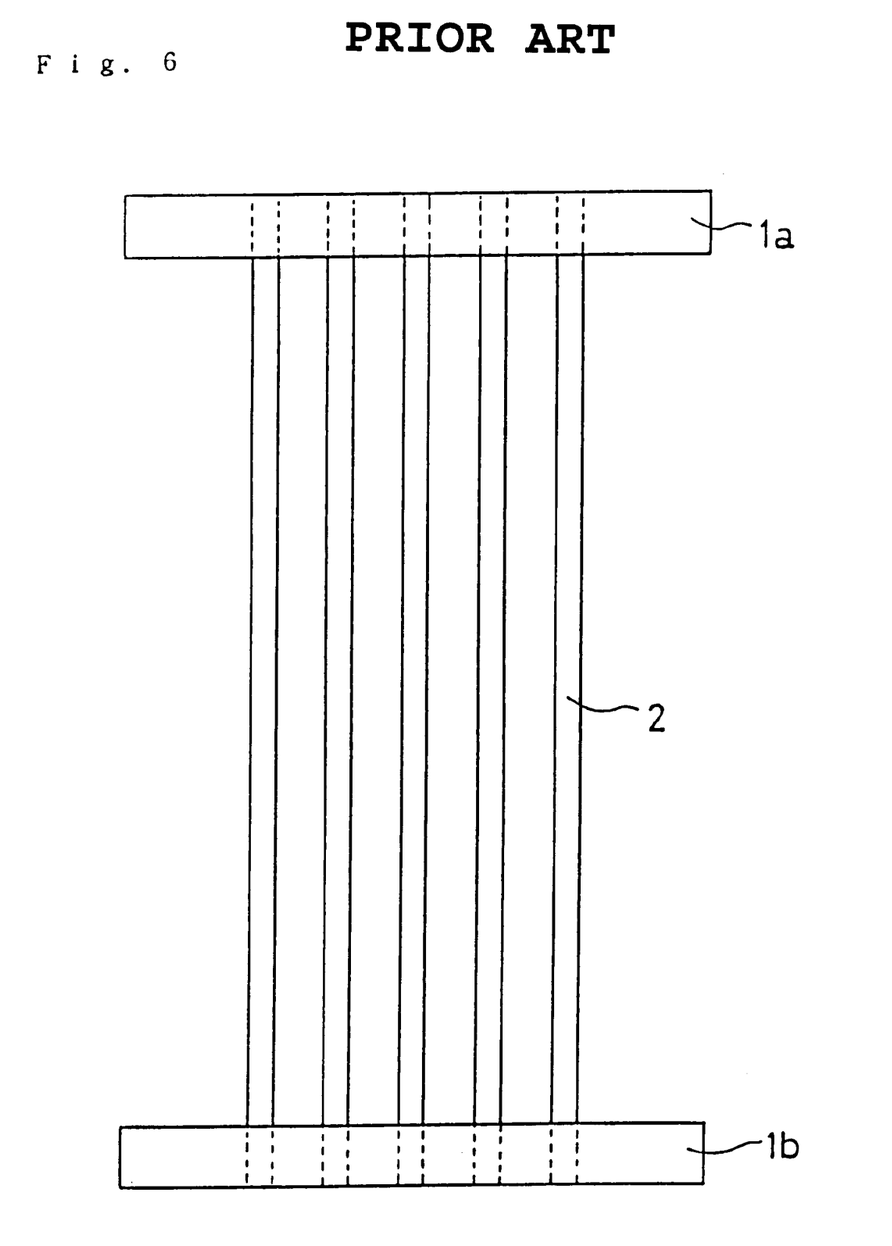
FIG. 6 is a schematic side view showing one embodiment of the ceramic shell-and-tube type heat exchanger manufactured by the conventional method.

Nowadays, the research and development of a forward type ceramic gas turbine have been carried out as a government project for the purposes of achieving high efficiency, low environmental pollution, the diversification of fuel, and the like. Thus, as one facet of this ceramic gas turbine, a heat exchanger made of a ceramic material having an excellent performance as a heat-resistant material for high temperatures has been developed in place of conventional metallic materials. FIG. 6 shows a schematic side view illustrating a ceramic shell-and-tube type heat exchanger which has been heretofore developed. In this drawing, two tubular plates 1a, 1b are joined and fixed to both the end portions of a plurality of heat transfer tubes 2 which are tubular ceramics, and the above-mentioned two tubular plates 1a, 1b are plate-like ceramics having a plurality of through-holes into which these heat transfer tubes 2 are inserted to be fixed.

Figure 7:
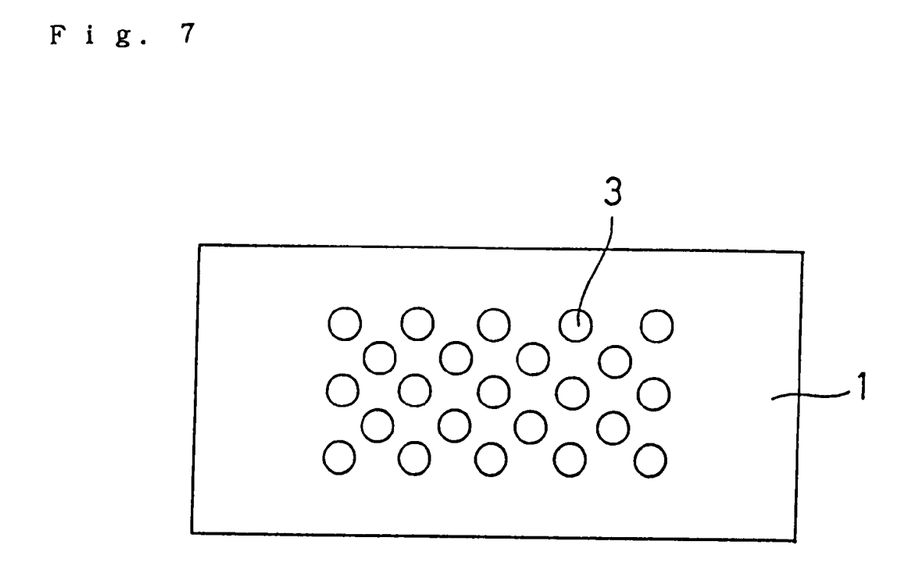
FIG. 7 is a plan view of a tubular plate.

As a method for preparing a ceramic shell-and-tube type heat exchanger, there is known a method which comprises inserting the end portions of the heat transfer tubes which are the sintered tubular ceramics into through-holes of tubular plates 1 which are unsintered plate-like ceramics having the plurality of through-holes 3 as shown in FIG. 7, and then firing these members in this condition, thereby integrally joining both the members to each other by the utilization of a difference between firing shrinkage ratios of both the members (this joining technique utilizing the difference between the firing shrinkage ratios will be hereinafter referred to as "firing join").

Figure 5:
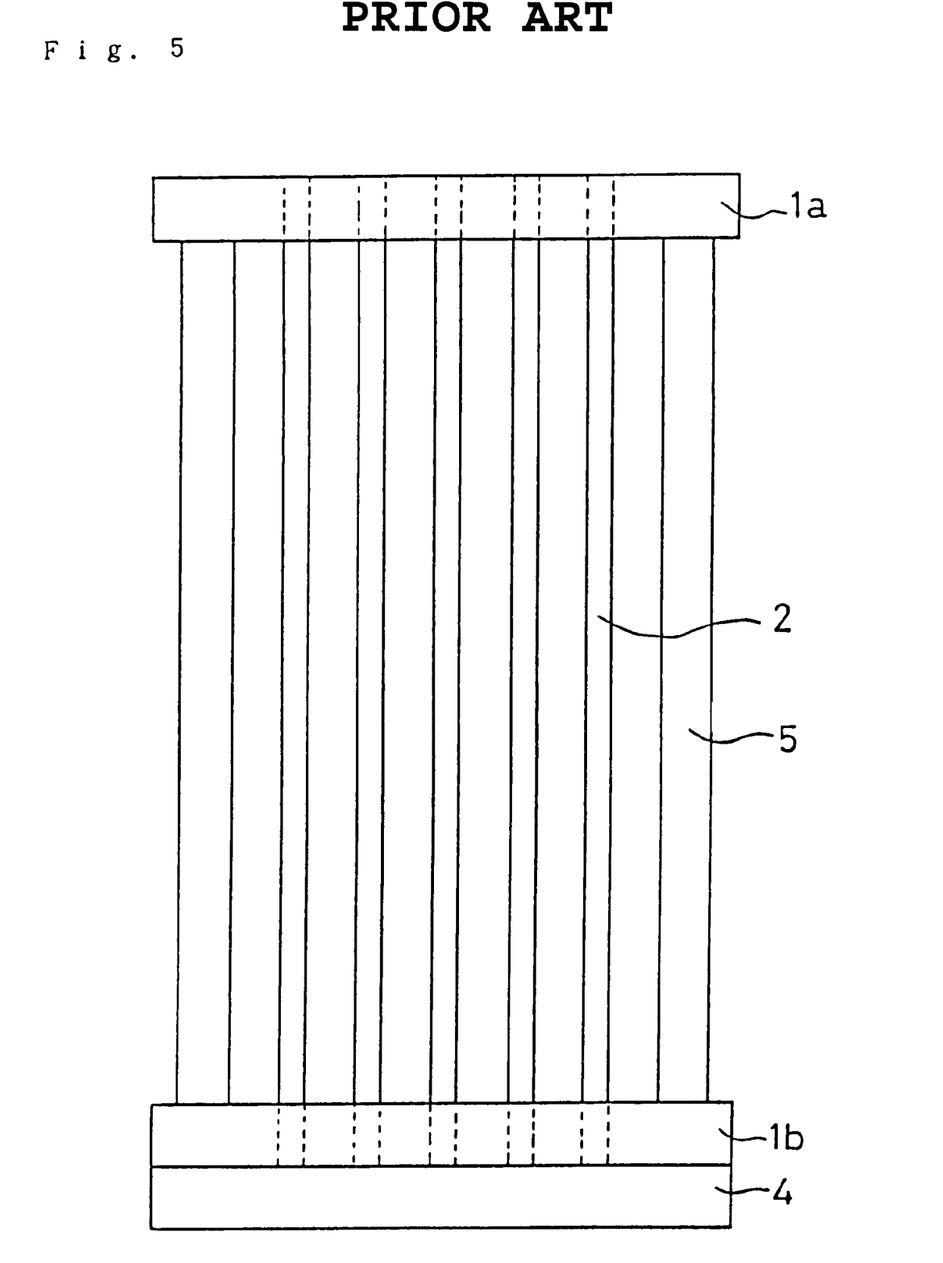
FIG. 5 is an illustrative side view showing one embodiment of a conventional method for manufacturing the ceramic shell-and-tube type heat exchanger.

In this case, the firing can usually be carried out in such a condition as shown in FIG. 5 where in a sagger having a sealed structure for the purposes of preventing contamination with carbon and the like from furnace materials and of regulating an atmosphere, a setter 4 is placed, the heat transfer tubes 2 are stood on this setter 4 so as to be vertical to a floor surface, and the tubular plates 1a, 1b are positioned at both the upper and lower end portions of the tubes 2 by the use of jigs 5.

However, in the above-mentioned conventional manufacturing method, the heat transfer tubes tend to be deformed during the firing join step. Therefore, joining strength between the heat transfer tubes and the tubular plates tends to deteriorate, and gas leakage is inconveniently liable to occur owing to a joining failure between the heat transfer tubes and the tubular plates. In particular, when the heat transfer tubes are long, the stiffness of the jigs used at the time of the firing join deteriorates, so that the heat transfer tubes are further noticeably deformed, which disturbs the manufacture of the ceramic shell-and-tube type heat exchanger having long heat transfer tubes.

Furthermore, in the conventional ceramic shell-and-tube type heat exchanger, the tubular plates are joined only to both the end portions of the heat transfer tubes as described above. Therefore, in attaching the heat exchanger to the ceramic gas turbine, the heat exchanger is secured only at both the end portions thereof, and hence, at the time of the attachment, the reliability of strength and vibration resistance in a gas flow have not been sufficient.

SUMMARY OF THE INVENTION

The present invention has been attained in view of such conventional circumstances. An object of the present invention is to provide a ceramic shell-and-tube type heat exchanger having the improved reliability of strength at the time of its attachment and improved vibration resistance in a gas flow, and another object of the present invention is to provide a method for manufacturing a ceramic shell-and-tube type heat exchanger which can prevent the deformation of heat transfer tubes in a firing join step.

In order to achieve the above-mentioned object, according to the present invention, there is provided a ceramic shell-and-tube type heat exchanger comprising a plurality of heat transfer tubes which are tubular ceramics and two tubular plates joined and fixed to both the end portions of the heat transfer tubes, the two tubular plates being plate-like ceramics having a plurality of through-holes into which these heat transfer tubes are inserted to be fixed, the heat exchanger comprising at least one tubular plate joined and fixed between the two tubular plates joined and fixed to both the end portions of the heat transfer tubes.

Furthermore, according to the present invention, there is provided a method for manufacturing a ceramic shell-and-tube type heat exchanger comprising a plurality of heat transfer tubes and tubular plates joined to both the end portions of these heat transfer tubes which comprises the steps of inserting the heat transfer tubes of sintered tubular ceramics into through-holes of the tubular plates of unsintered plate-like ceramics having a plurality of the through-holes, standing the heat transfer tubes vertically to a floor surface, and then firing them in a condition where the tubular plates are positioned at both the upper and lower end portions of the heat transfer tubes, thereby integrally joining the tubular plates to both the end portions of the plurality of heat transfer tubes by the utilization of a difference between firing shrinkage ratios of both the members, the method comprising the steps of interposing at least one tubular plate between the tubular plate positioned at the upper end portions and the tubular plate positioned at the lower end portions of the heat transfer tubes, and then heating/firing them to integrally join them.

Incidentally, in the present invention, the unsintered ceramics mean molded articles (a green ware) or calcined articles (a calcined ware) of the ceramics.

DETAILED DESCRIPTION OF THE INVENTION

According to a manufacturing method comprising the above-mentioned constitution, a tubular plate (hereinafter referred to as "an intermediate tubular plate") is interposed between the tubular plate positioned at the upper end portions of heat transfer tubes (hereinafter referred to as "an upper tubular plate") and the tubular plate positioned at the lower end portions (hereinafter referred to as "a lower tubular plate") of the heat transfer tubes, whereby the deformation of the heat transfer tubes in a firing join step can be prevented, with the result that a heat exchanger having excellent shape accuracy can be obtained.

No particular restriction is put on the number of the intermediate tubular plates, so long as it is one or more. In order to prevent the deformation of the heat transfer tubes, the higher the number of intermediate tubular plates, the better. However, if an excessively large number of the intermediate tubular plates are interposed, the heat exchange efficiency might be inconveniently affected. Therefore, the number of intermediate tubular plates should be selected in conjunction with the length of the heat transfer tubes. For the purpose of effectively preventing the deformation of the heat transfer tubes by the smallest possible number of intermediate tubular plates, it is preferred that the intermediate tubular plates are arranged so that intervals between the respective tubular plates may be substantially equal to each other.

The thickness of the intermediate tubular plates is preferably 10% or less of the length of each heat transfer tube to inhibit the loss of the heat exchange efficiency, and it is also preferably 5 mm or more from the viewpoint of preventing the deformation of the intermediate tubular plates at the time of the firing join.

Figure 1:
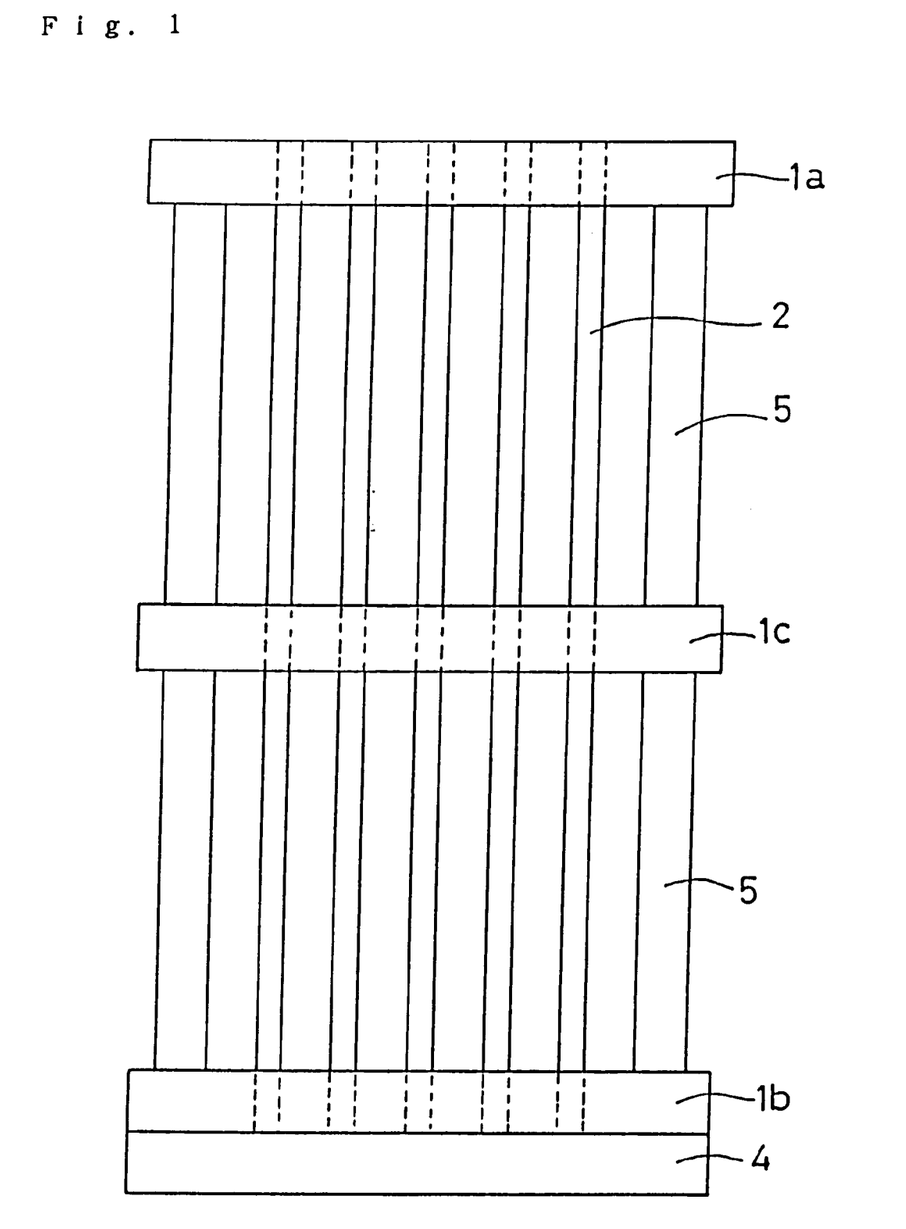
FIG. 1 is an illustrative side view showing one embodiment of a method for manufacturing a ceramic shell-and-tube type heat exchanger regarding the present invention.
Figure 3:
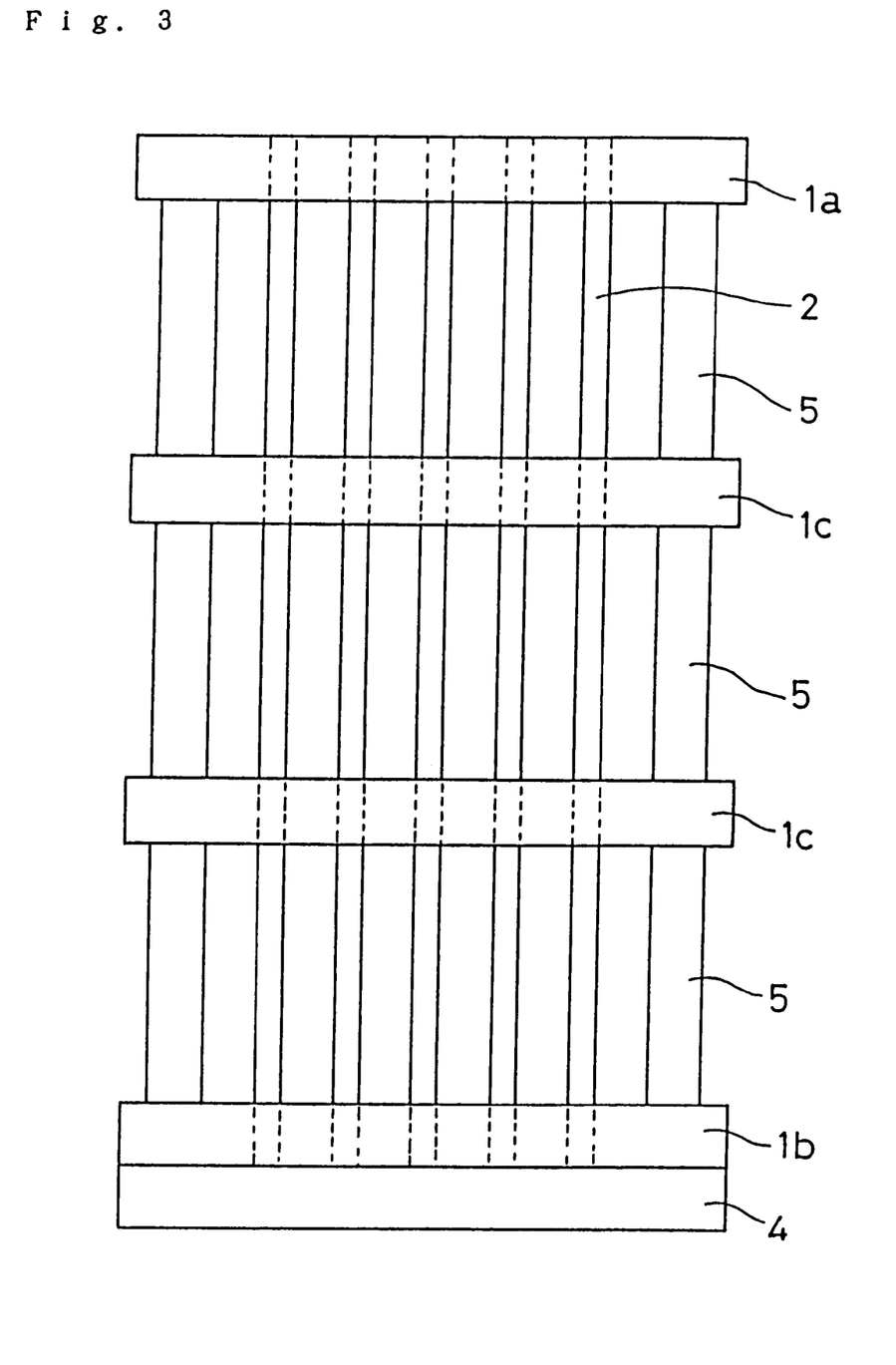
FIG. 3 is an illustrative side view showing another embodiment of the method for manufacturing the ceramic shell-and-tube type heat exchanger regarding the present invention.

FIG. 1 is an illustrative side view of a manufacturing example in which one intermediate tubular plate is interposed, and FIG. 3 is an illustrative side view in which two intermediate tubular plates are interposed. As shown in these drawings, heat transfer tubes 2 which are sintered tubular ceramics are inserted into through-holes of tubular plates 1a, 1c and 1b which are unsintered ceramics. The upper tubular plate 1a, the lower tubular plate 1b and the intermediate tubular plate 1c are positioned at the upper end portion, at the lower end portion, and at the center of the heat transfer tubes 2, respectively, which are vertically stood on a setter 4 by the use of fixation jigs 5. By carrying out firing in such a condition, the tubular plates 1a, 1b and 1c of the unsintered ceramics having a high firing shrinkage ratio fasten the heat transfer tubes 2 in the through-holes, so that both the members can be joined.

In the thus obtained ceramic shell-and-tube type heat exchanger of the present invention, the tubular plates are joined and fixed to both the end portions of the heat transfer tubes, and the at least one intermediate tubular plate is further joined and fixed in the middle of the heat transfer tubes. Therefore, in attaching the heat exchanger to a gas turbine, the heat transfer tubes can be secured and supported not only by the upper and lower tubular plates at both the end portions thereof but also by the intermediate tubular plate, so that the reliability of strength at the time of the attachment and vibration resistance in a gas flow at the time of use can be improved.

As the ceramics for use in the present invention, silicon nitride and silicon carbide having high strength and high heat resistance can be preferably used. The tubular plates and the heat transfer tubes are usually constituted with one kind of ceramic. No particular restriction is put on the shape, thickness and size of the perforated plates, the number and arrangement of holes formed in each tubular plate, and the like, and they can be suitably selected in compliance with conditions to be used and the like. The through-holes of the tubular plates may be formed simultaneously with the molding of plates having the fundamental shape of the tubular plates, or they may be formed by a means such as punching or ultrasonic working after the molding.

Next, the present invention will be described in more detail on the basis of examples, but the scope of the present invention should not be limited to these examples.

EXAMPLE 1

To 1000 g of an $Si_3N_4$ powder were added 10 g of $Y_2O_3$, 10 g of MgO, 5 g of $ZrO_2$ as sintering auxiliaries, and 1 g of polyvinyl alcohol as an organic binder, and 1000 g of water was further added thereto. Afterward, they were ground and mixed for 4 hours by the use of $Si_3N_4$ balls (diameter=5 mm) and an attritor. The resultant finely ground mixture was dried and granulated by a spray dryer to obtain a powder material. Next, tubular articles were molded from the thus obtained powder material by extrusion, and then dried at 110° C. for 10 hours. After the drying, the binder was burned out at 500° C. for 5 hours, and firing was further made at 1650° C. for 1 hour to obtain heat transfer tubes (sintered products) having an outer diameter of 8 mm, an inner diameter of 6 mm and a length of 600 mm.

On the other hand, plate-like articles were molded from the same material as in the preparation of the heat transfer tubes under a pressure of 7 tons/$cm^2$ by hydrostatic pressure press molding. Next, these articles were dried and the binder was burned out under the same conditions as in the preparation of the heat transfer tubes, and calcination was further made at 1350° C. for 3 hours in a nitrogen atmosphere. Through the thus calcined articles having a size of 350×170 mm and a thickness of 20 mm, a plurality of through-holes having a diameter of 9.3 mm into which the tubes would be inserted for joining were formed by ultrasonic working to obtain upper, lower and intermediate tubular plates (calcined products).

Figure 2:
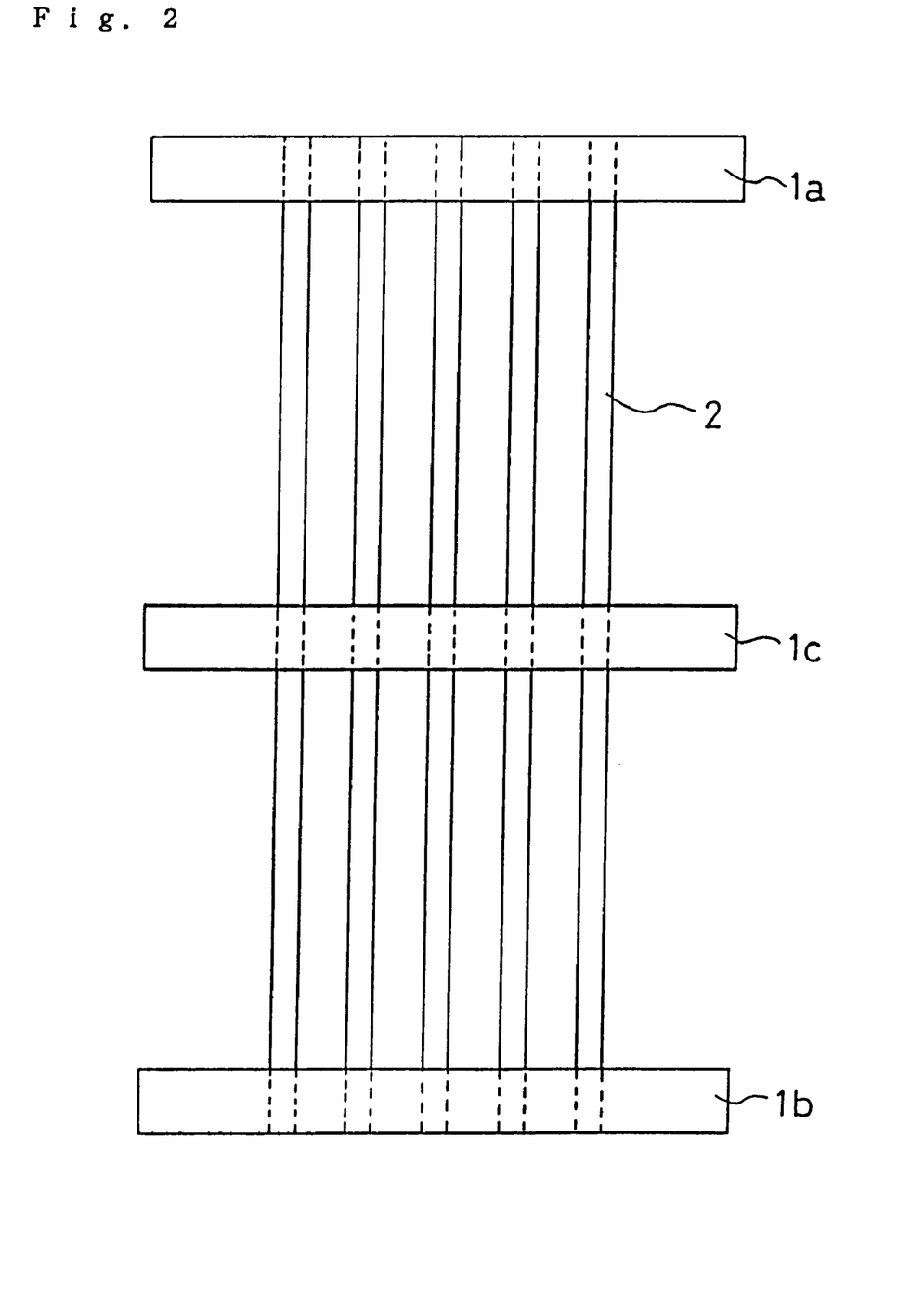
FIG. 2 is a schematic side view showing one embodiment of the ceramic shell-and-tube type heat exchanger obtained by the manufacturing method of the present invention.

Next, as shown in FIG. 1, the heat transfer tubes 2 were inserted into the through-holes of the thus obtained upper tubular plate 1a, intermediate tubular plate 1c and lower tubular plate 1b, and in a condition where the respective tubular plates were positioned on a setter 4 by fixation jigs 5, they were fired at 1650° C. for 3 hours in a nitrogen atmosphere to obtain such a shell-and-tube type heat exchanger as shown in FIG. 2 in which the tubular plates 1a, 1c and 1b were integrally joined to the upper and lower end portions and the intermediate portions of the heat transfer tubes 2. In this case, the setter 4 was prepared by the same procedure as in the preparation of the tubular plates except that the through-holes were not formed, and the fixation jigs 5 were sintered tubes made of the same material as in the preparation of the heat transfer tubes. In this case, an interference of the firing join was 0.2 mm.

EXAMPLE 2

Figure 4:
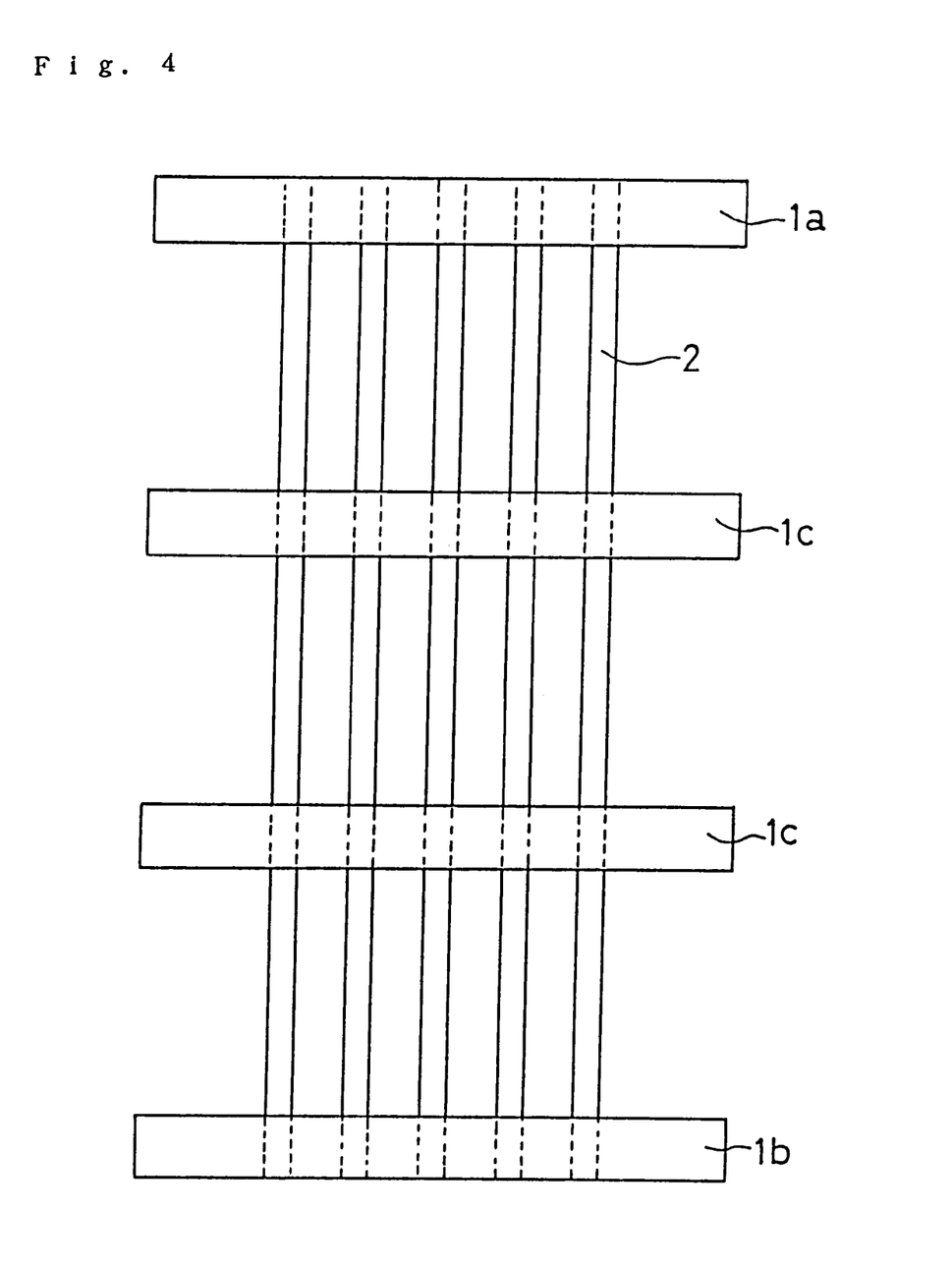
FIG. 4 is a schematic side view showing another embodiment of the ceramic shell-and-tube type heat exchanger obtained by the manufacturing method of the present invention.

The same procedure as in Example 1 was carried out except that firing was done in a condition where two intermediate tubular plates 1c were interposed between an upper tubular plate 1a and a lower tubular plate 1b as shown in FIG. 3, to obtain such a shell-and-tube type heat exchanger as shown in FIG. 4 in which the tubular plates 1a and 1b were joined to both the upper and lower end portions of the heat transfer tubes 2, and two tubular plates 1c were integrally joined at such positions as to take equal intervals between the adjacent tubular plates.

COMPARATIVE EXAMPLE (CONVENTIONAL EXAMPLE)

The same procedure as in Example 1 was carried out except that a firing join was done without interposing any intermediate tubular plate between an upper tubular plate 1a and a lower tubular plate 1b as shown in FIG. 5, to obtain such a shell-and-tube type heat exchanger as shown in FIG. 6 in which the tubular plates 1a and 1b were integrally joined to both the upper and lower end portions of the heat transfer tubes 2.

For the shell-and-tube type heat exchangers obtained in Examples 1 and 2 and Comparative Example, the deformation (straightness) of heat transfer tubes was measured. As a result, the deformation of the heat transfer tubes in Comparative Example in which the firing join was done without interposing any intermediate tubular plate was about 30 mm. On the other hand, the deformation of the heat transfer tubes in Example 1 in which one intermediate tubular plate was interposed was in the range of about 15 to 20 mm, and the deformation in Example 2 in which two intermediate tubular plates were interposed was in the range of about 2 to 3 mm. Thus, in Examples 1 and 2, the deformation of the heat transfer tubes could be largely inhibited, as compared with Comparative Example.

As described above, according to a method for manufacturing a ceramic shell-and-tube type heat exchanger of the present invention, firing can be done in a condition where at least one intermediate tubular plate is interposed between a tubular plate positioned at upper end portions and another tubular plate positioned at lower end portions of heat transfer tubes to integrally join these members to each other, whereby the deformation of the heat transfer tubes can be remarkably inhibited. As a consequence, there can be obtained the ceramic shell-and-tube type heat exchanger which is free from the deterioration of joining strength due to the deformation of the heat transfer tubes in the firing join step and the occurrence of gas leakage due to a joining failure. The manufacturing method of the present invention is useful to manufacture the ceramic shell-and-tube type heat exchanger having long heat transfer tubes.

In addition, in attaching the ceramic shell-and-tube type heat exchanger of the present invention to a gas turbine, the heat transfer tubes can be not only secured by the upper and lower tubular plates at both the end portions thereof but also supported by the intermediate tubular plate, so that the reliability of strength at the time of the attachment and vibration resistance in a gas flow at the time of use can be improved.

What is claimed is:

1. A ceramic shell-and-tube type heat exchanger comprising:

a plurality of ceramic heat transfer tubes, each of said tubes having an upper end and a lower end;

an upper tubular plate integrally and permanently joined to the upper end of each of said tubes, said upper plate being comprised of a ceramic and having a plurality of holes for receiving the upper end of each of said tubes;

a lower tubular plate integrally and permanently joined to the lower end of each of said tubes, said lower plate being comprised of a ceramic and having a plurality of holes for receiving the lower end of each of said tubes; and at least one intermediate tubular plate integrally and permanently joined to each of said tubes between said upper and lower plates, said at least one intermediate plate being comprised of a ceramic and having a plurality of holes corresponding to the plurality of ceramic heat transfer tubes for receiving each of said tubes and not having other holes, wherein said upper tubular plate, intermediate tubular plate and lower tubular plate are joined to said tubes by sintering, and wherein said at least one intermediate plate has sufficient strength to prevent said tubes from substantial deformation during firing to join said tubes to said upper tubular plate, said lower tubular plate, and said at least one intermediate tubular plate.

2. The heat exchange of claim 1, wherein the at least one intermediate plate has a thickness that is 10% or less of a length of the heat transfer tubes.

3. The heat exchanger of claim 1, wherein the at least one intermediate plate has a thickness of at least 5 mm.

4. The heat exchanger of claim 1, wherein each of the heat transfer tubes, the upper and lower plates, and at least one intermediates plate is comprised of a ceramic selected from the group consisting of silicon nitride and silicon carbide.

* * * * *